United States Patent
Wu et al.

(10) Patent No.: US 9,741,980 B2
(45) Date of Patent: Aug. 22, 2017

(54) STORAGE STRUCTURE AND DEVICE HAVING THE SAME

(71) Applicant: ABILITY ENTERPRISE CO., LTD., New Taipei (TW)

(72) Inventors: Wan-Chin Wu, New Taipei (TW); Shu-Hung Liu, New Taipei (TW); Chun-Ho Hsiao, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 240 days.

(21) Appl. No.: 14/031,312

(22) Filed: Sep. 19, 2013

(65) Prior Publication Data

US 2014/0113170 A1    Apr. 24, 2014

(30) Foreign Application Priority Data

Oct. 23, 2012   (TW) .............................. 101139099 A

(51) Int. Cl.
| | |
|---|---|
| *H01M 2/10* | (2006.01) |
| *H04M 1/02* | (2006.01) |
| *H04B 1/3883* | (2015.01) |
| *H04B 1/38* | (2015.01) |

(52) U.S. Cl.
CPC ........ *H01M 2/1022* (2013.01); *H01M 2/1066* (2013.01); *H04B 1/38* (2013.01); *H04B 1/3883* (2013.01); *H04M 1/0262* (2013.01); *H04M 2001/0204* (2013.01)

(58) Field of Classification Search
None
See application file for complete search history.

(56) References Cited

U.S. PATENT DOCUMENTS

| | | | |
|---|---|---|---|
| 5,576,929 A | 11/1996 | Uchiyama et al. | |
| 6,935,661 B1 | 8/2005 | Farnsworth et al. | |
| 7,789,438 B2 | 9/2010 | Shi et al. | |
| 8,257,853 B2 | 9/2012 | Dong | |
| 2004/0229114 A1 | 11/2004 | Liang et al. | |
| 2006/0172183 A1 | 8/2006 | Chen et al. | |
| 2009/0084040 A1* | 4/2009 | Kondo | H04N 5/2251 49/394 |
| 2009/0190288 A1* | 7/2009 | Tanabe | G03B 17/02 361/600 |

(Continued)

FOREIGN PATENT DOCUMENTS

| | | |
|---|---|---|
| CN | 1681144 A | 10/2005 |
| CN | 2777910 Y | 5/2006 |
| CN | 101540383 A | 9/2009 |

(Continued)

OTHER PUBLICATIONS

Definition of "slide", www.dictionary.com (Aug. 8, 2016).*
Taiwanese Office Action dated Jan. 10, 2017.

*Primary Examiner* — Patrick Ryan
*Assistant Examiner* — Carmen Lyles-Irving
(74) *Attorney, Agent, or Firm* — Rabin & Berdo, P.C.

(57) ABSTRACT

A storage structure including a housing, a locker, a cover and a connector is provided. The housing has a receiving slot. The locker is disposed in the receiving slot, and includes a locking portion. The cover includes a protrusion. The protrusion and the locking portion are engaged with each other. The connector is pivotally connected between the cover and the housing.

11 Claims, 6 Drawing Sheets

(56) References Cited

U.S. PATENT DOCUMENTS

2010/0062324 A1* 3/2010 Ooyama .................. 429/97

FOREIGN PATENT DOCUMENTS

| CN | 201311534 Y | 9/2009 |
|---|---|---|
| CN | 102036518 A | 4/2011 |
| EP | 1585290 A2 | 10/2005 |
| JP | 2003077441 A | 3/2003 |
| JP | 2005142153 A | 6/2005 |

* cited by examiner

STORAGE STRUCTURE AND DEVICE HAVING THE SAME

This application claims the benefit of Taiwan application Serial No. 101139099, filed Oct. 23, 2012, the subject matter of which is incorporated herein by reference.

BACKGROUND OF THE INVENTION

Field of the Invention

The invention relates in general to a storage structure, and more particularly to a storage structure and a device having the same.

Description of the Related Art

Due to the consideration of portability and lightweight, ordinary portable electronic devices are powered by battery. When the power of the battery is used up, the battery can be replaced or charged.

To replace the battery, the user firstly needs to open the cover to expose the battery, and then releases the battery fixing structure to remove the battery. However, if the battery is not replaced with an OEM battery or is misused, the battery may easily damage or even burn down electronic components. Besides, since the cover fixing structure and the battery fixing structure are formed by different accessories, the number of accessories and assembly cost will increase and such design cannot satisfy the needs for a simplified and low-cost structure.

SUMMARY OF THE INVENTION

The invention is directed to a storage structure for an electronic component, which includes a cover and a locker combined as an integrated structure to satisfy the needs for a simplified and low-cost structure.

According to one embodiment of the present invention, a storage structure including a housing, a locker, a cover and a connector is provided. The housing has a receiving slot. The locker is disposed in the receiving slot, and includes a locking portion. The cover includes a protrusion. The protrusion and the locking portion are engaged with each other. The connector is pivotally connected between the cover and the housing.

According to another embodiment of the present invention, a storage structure including a housing, a cover, a locker and an elastic member is provided. The housing has a receiving slot. The cover covers the receiving slot, and includes a protrusion. The locker is disposed in the receiving slot, and includes a locking portion and a lifting portion. The locking portion and the protrusion are engaged with each other. The lifting portion locks the cover. The elastic member connects the housing and the locker.

According to an alternate embodiment of the present invention, a storage structure for an electronic component is provided. The storage structure includes a housing, a locker, a cover and a connector. The housing has a receiving slot. The locker is disposed in the receiving slot, and includes a locking portion. The cover includes a protrusion. The protrusion and the locking portion are disposed correspondingly. The connector is pivotally connected between the cover and the housing. When the cover is in a locking state, the locking portion and the protrusion are engaged with each other. When the cover is released from the locking state, the locking portion and the protrusion are separated from each other.

The above and other aspects of the invention will become better understood with regard to the following detailed description of the preferred but non-limiting embodiments. The following description is made with reference to the accompanying drawings.

DETAILED DESCRIPTION OF THE INVENTION

Unlike the conventional design in which the cover fixing structure and the battery fixing structure are separately disposed, the storage structure for an electronic component of the present embodiment uses an integrated structure to fix and open the cover. For example, in the present embodiment, the locker is used as a common component, not only a component for fixing the battery but also a component for fixing the connecting port. By operating the locker, the user can easily open the cover or fix the cover on the housing. Such design satisfies the needs for a simplified and low-cost structure. The storage structure of the invention can be widely used in various electronic devices such as digital camera, digital video recorder, mobile phone, personal digital assistant (PDA) and personal computer, particularly used in the positions for receiving battery and various ports.

A number of embodiments are disclosed below for elaborating the invention. However, the embodiments of the invention are for detailed descriptions only, not for limiting the scope of protection of the invention.

Figure 1:
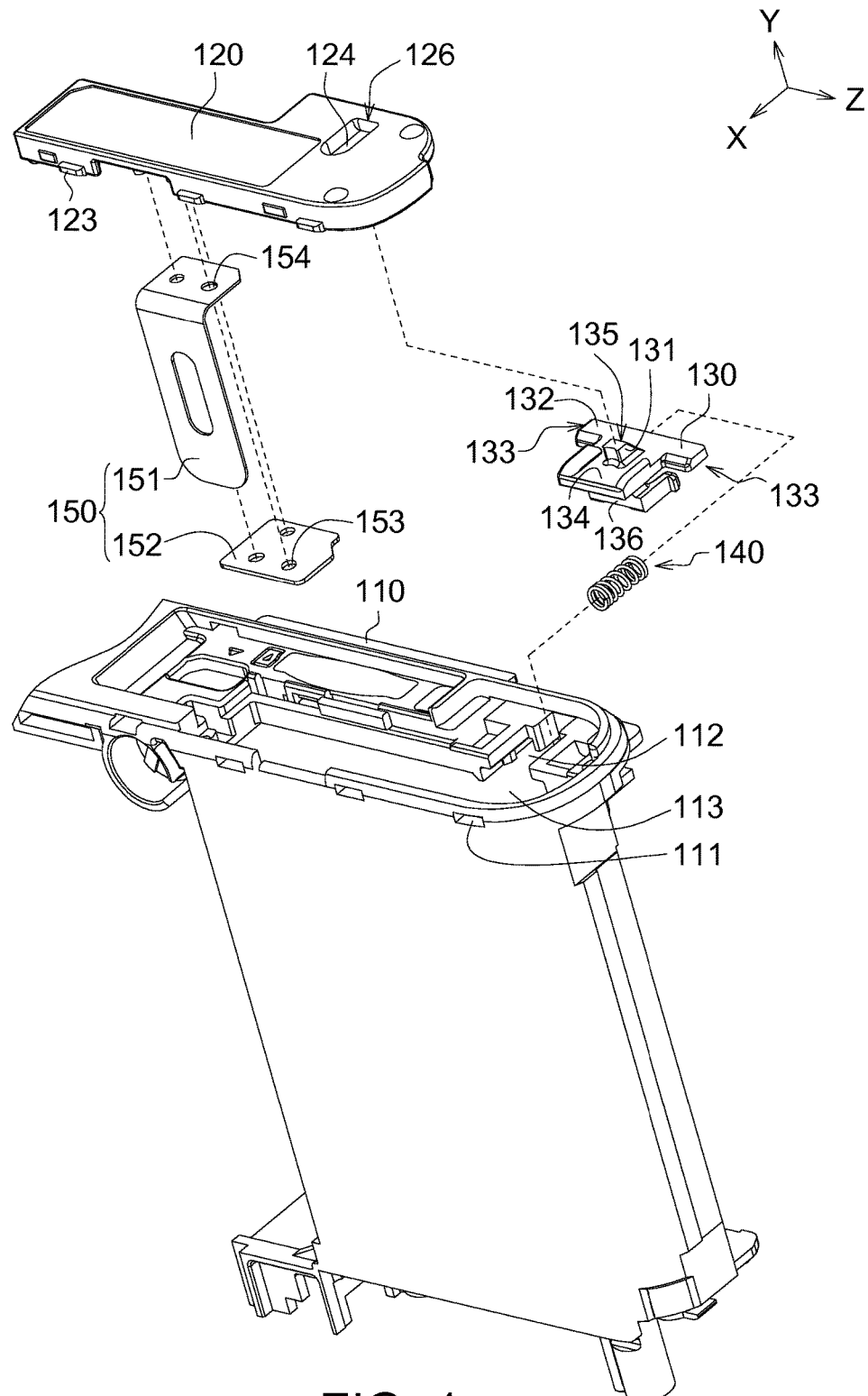
FIG. 1 is an explosion diagram illustrating a storage structure for an electronic component according to an embodiment of the invention.
Figure 2:
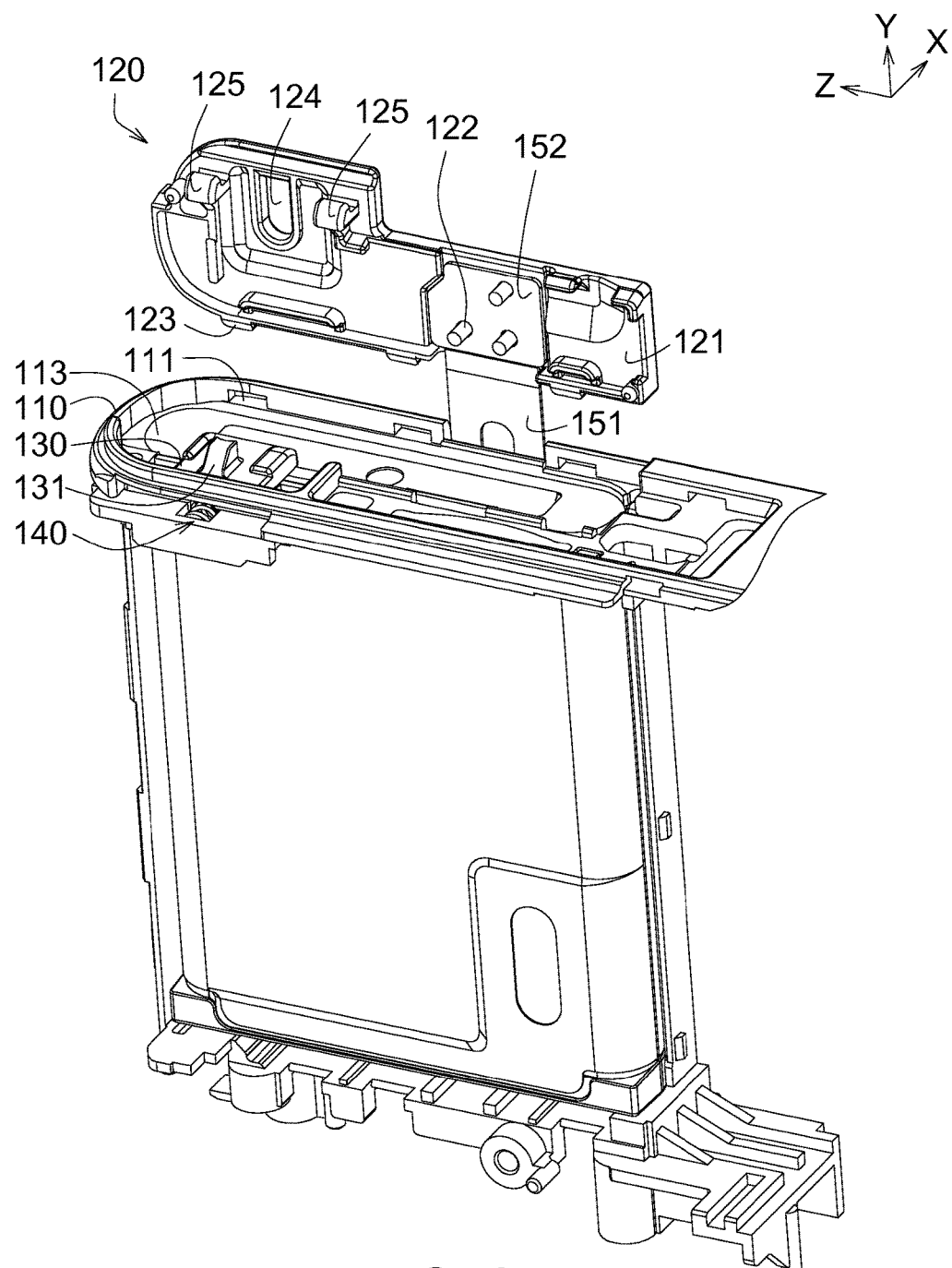
FIG. 2 is an assembly diagram illustrating a storage structure for an electronic component according to an embodiment of the invention.

FIG. 1 is an explosion diagram illustrating a storage structure for an electronic component according to an embodiment of the invention. FIG. 2 is an assembly diagram illustrating a storage structure for an electronic component according to an embodiment of the invention.

The storage structure 100 for an electronic component includes a housing 110, a cover 120, a locker 130, an elastic member 140 and a connector 150. In an embodiment, the cover 120 can be connected to the housing 110 through the connector 150 to avoid the cover 120 dropping off or missing. Also, the cover 120 can be easily opened with an elastic force provided by the connector 150. In another embodiment, the cover 120 can be fixed on the housing 110 through other types of connectors. For instance, the connector 150 is pivotally connected between the cover 120 and the housing 110 by using a rotation axis as a pivotal point. Then, a torsion spring provides a torque to open the cover 120 upward. The connector 150 disclosed above is for exemplification purpose, and the invention is not limited thereto.

As indicated in FIG. 1, in the present embodiment, the connector 150 connected between the cover 120 and the housing 110 is flexible and includes a soft substrate 151 and a fixing plate 152. In FIG. 2, the soft substrate 151 is extended to the housing 110 and fixed therein. Also, a portion of the soft substrate 151 is exposed from the housing 110, and is fixed on the bottom side 121 of the cover 120 by the fixing plate 152. For instance, a number of heat stakes 122 on the cover 120 penetrate the through hole 154 of the soft substrate 151 and the through hole 153 of the fixing plate 152. Each portion of the heat stakes 122 protruded from the through holes 153 and 154 is further melted to form a rivet-like structure (not illustrated), such that the soft substrate 151 is tightly interposed between the cover 120 and the fixing plate 152. The cover structure disclosed above is for exemplification purpose, and the invention is not limited thereto.

Next, referring to FIGS. 1 and 2. The cover 120 has a plurality of hooks 123, for example. During the assembly process, the cover 120 is pivotally connected to the housing 110 by using the hooks 123 as pivotal points. In the present embodiment, the peripheral of the housing 110 has a plurality of slots 111 opposite to the hooks 123. The slots 111 and the hooks 123 interfere with each other. When the cover 120 is assembled to the slots 111 of the housing 110 and completely covers the receiving slot 113 of the housing 110, the movement of the cover 120 is restricted by the hooks 123 and the slots 111 to assure that the cover 120 tightly covers the receiving slot 113 and protects an internal electronic component such as a battery or a connecting port.

When the cover 120 is opened, the cover 120 is rotated to an angle large enough to free the cover 120 from the restriction of the hooks 123 and the slots 111. Since the soft substrate 151 is still fixed on the housing 110, the cover 120 is moveable, hence providing more convenience and flexibility of use. In another embodiment, the hooks 123 and the slots 111 are exchangeable with each other. That is, the cover 120 has at least one slot 111, and the housing 110 has at least one hook 123 corresponding to the at least one slot 111. In another embodiment, the hooks 123 and the slots 111 can be designed as fixed pivotal points through which the cover 120 is pivotally connected to the housing 110. Thus, the movement of the cover 120 is restricted. The cover structure disclosed above is for exemplification purpose, and the invention is not limited thereto.

The relationship of movement between the cover 120, the locker 130 and the elastic member 140 is elaborated below with accompanying drawings. Referring to FIG. 1, the cover 120 has an opening 124. The locker 130 has a lifting portion 131. The opening 124 is disposed above the lifting portion 131, and accommodates the lifting portion 131. The locker 130 further includes a locking portion 132. The locking portion 132 can be two ribs 133 protruding towards the positive/negative Z directions. Although two ribs 133 are exemplified in the present embodiment, one rib would do as well, and the invention does not impose specific restrictions regarding the number of ribs. In FIG. 2, the cover 120 further includes a protrusion 125. The protrusion 125 can be a protrusion, which protrudes towards the negative X direction from the bottom side 121 and hooks back towards the positive Y direction. Although two protrusions 125 are exemplified in the present embodiment, one protrusion 125 would do as well, and the invention does not impose specific restrictions regarding the number of protrusions.

Figure 3A:
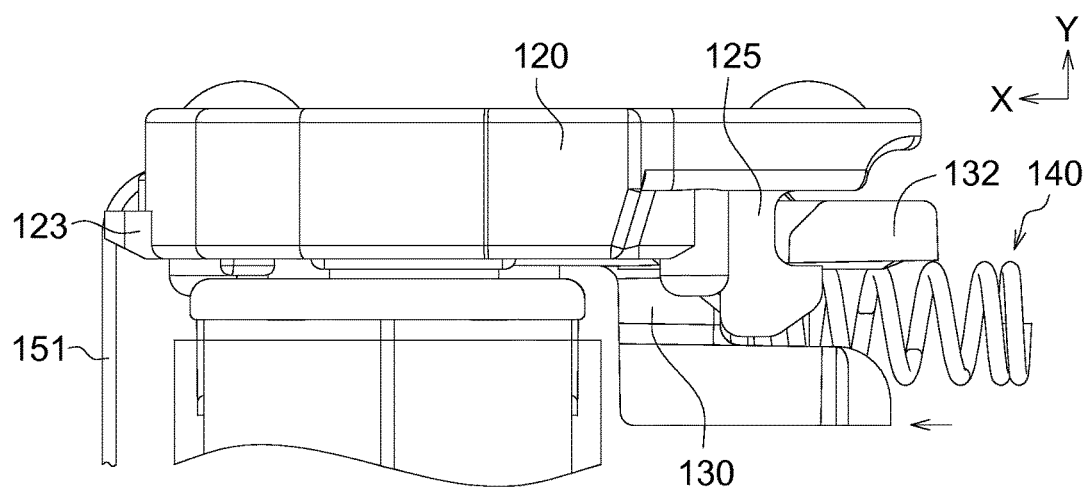
FIG. 3A is a cross-sectional diagram illustrating a protrusion of a cover contacting a locking portion of a locker.
Figure 3B:
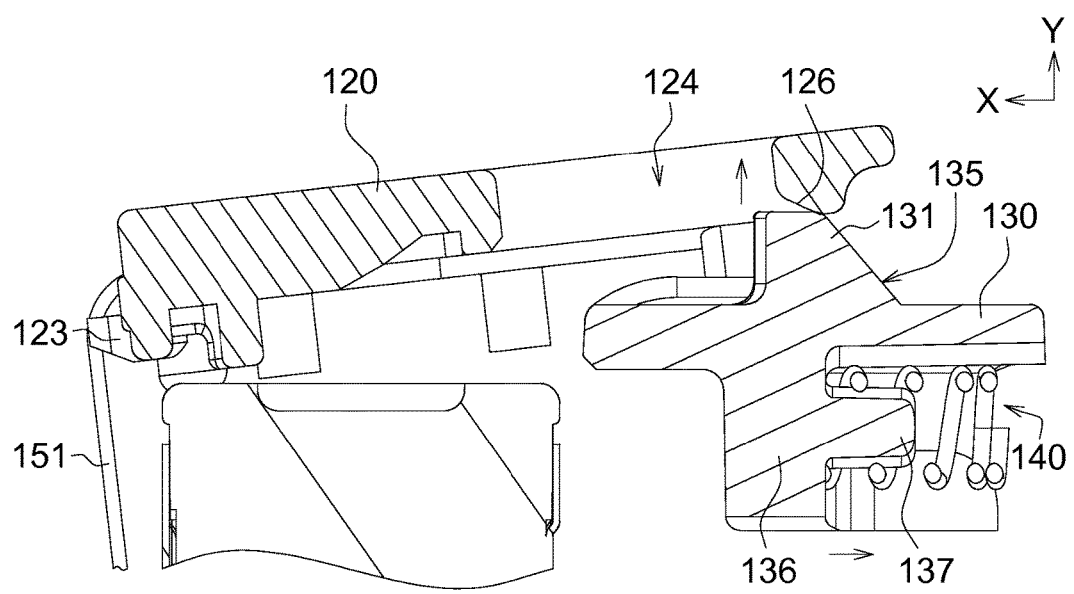
FIG. 3B is a cross-sectional diagram illustrating an opening of a cover contacting a lifting portion of the locker.
Figure 3C:
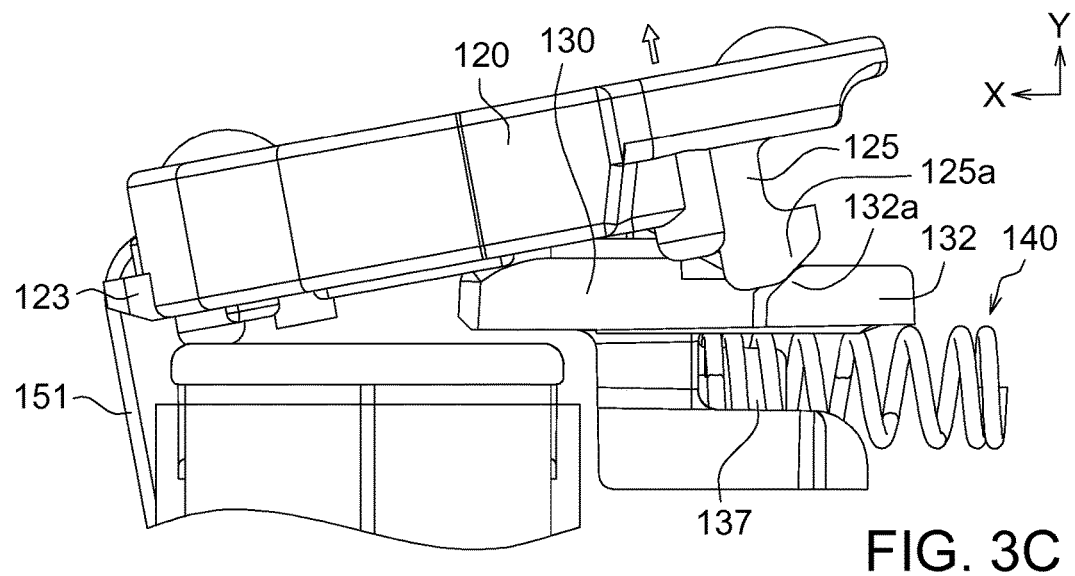
FIG. 3C is a cross-sectional diagram illustrating a protrusion of a cover moving upwards.

When the cover 120 is in a locking state, the locking portion 132 and the protrusion 125 are engaged with each other in the Y direction as indicated in FIG. 3A. When the cover 120 is released from the locking state, the locking portion 132 and the protrusion 125 are separated from each other in the Y direction as indicated in FIG. 3C.

In the present embodiment, the elastic member 140 moveably connects the housing 110 and the locker 130. For instance, the elastic member 140 includes a spring interposed between the housing 110 and the locker 130 along the positive/negative X directions. The elastic member 140 provides elasticity such that the locker 130 can move in the positive/negative X directions. Referring to FIG. 3B, the bottom 136 of the locker 130 has a rib 137, which can be inserted into one end of the elastic member 140 for fixing the elastic member 140 on the bottom 136 of the locker 130. Then, the locker 130 and the elastic member 140 together are fixed in the receiving slot 113 of the housing 110.

Referring to FIG. 1, in a normal state, the elastic member 140 and the bottom 136 of the locker 130 are located in the recess 112 of the receiving slot 113. A plate 134 of the locker 130 extends atop the receiving slot 113. A battery (not illustrated) disposed in the receiving slot 113 maintains contact with the plate 134, which restricts the battery in the receiving slot 113 as indicated in FIG. 2. By doing so, the battery will not be dislocated and power failure can thus be avoided. The fixing structure disclosed above is for exemplification purpose, and the invention is not limited thereto.

In the present embodiment, the locker 130 is disposed in the receiving slot 113, and opposite to the bottom side 121 of the cover 120. FIG. 3A is a cross-sectional diagram illustrating the protrusion 125 of the cover 120 contacting a locking portion 132 of a locker 130. In the locking state, the elastic member 140 enables the locking portion 132 and the protrusion 125 to be engaged with each other in the positive X direction, such that the cover 120, being restricted in the positive X direction and the positive Y direction, cannot be opened.

Figure 5A:
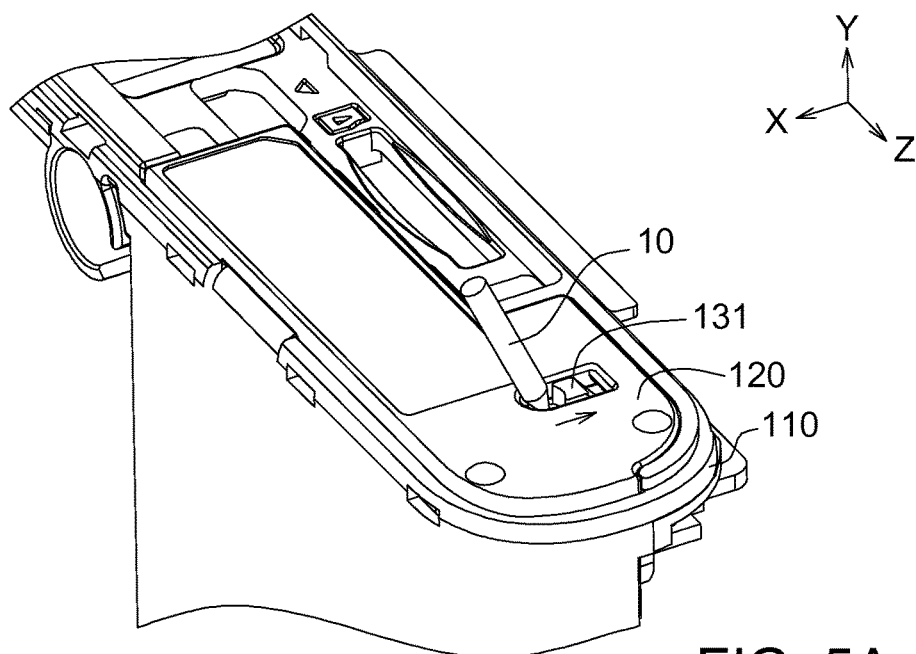
FIGS. 5A and 5B are schematic diagrams illustrating a cover being opened with a tool.
Figure 5B:
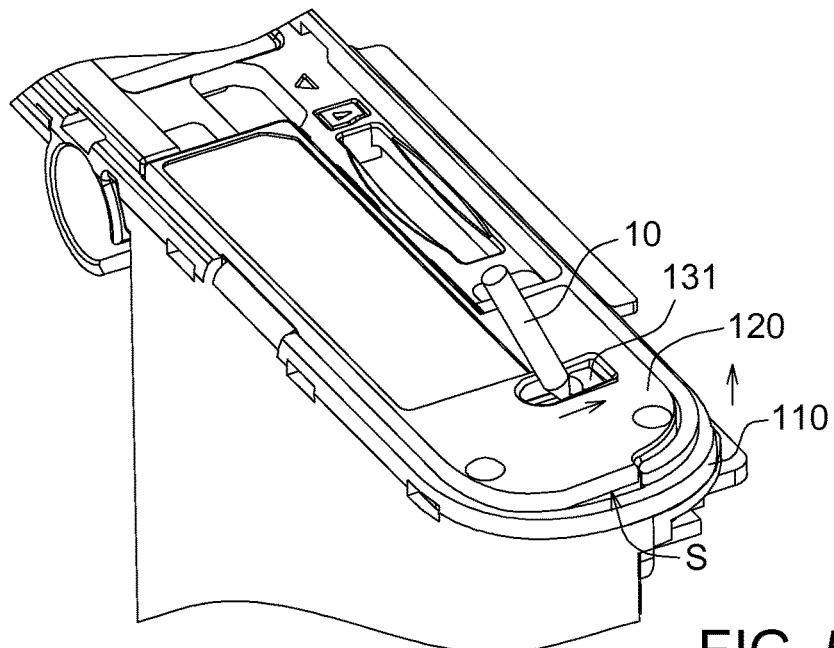

Referring to FIG. 3B, a cross-sectional diagram illustrating the opening 124 of the cover 120 contacting a lifting portion 131 of a locker 130 is shown. To open the cover 120, the user can applies a force on the lifting portion 131 with a finger or a tool to move the lifting portion 131 in the opening 124 towards the negative X direction until the lifting portion 131 leans on the opening 124 (as indicated in FIG. 5A). Meanwhile, the lifting portion 131 pushes the cover 120 to open the cover 120 upwards (as indicated in FIG. 5B).

For instance, the lifting portion 131 has a bevel 135. When the lifting portion 131 is moved in the opening 124 towards the negative X direction, the bevel 135 leans on a sidewall 126 of the cover 120. With an inclined component of force, the bevel 135 pushes the sidewall 126 of the cover 120 to move along the bevel 135 towards the positive Y direction (as indicated in FIG. 3B). In the above disclosure, the lifting portion 131 generates an inclined component of force with the protruded bevel 135 and the displacement in the negative X direction. In another embodiment, the lifting portion 131 may generate an inclined component of force with a concaved bevel and the displacement in the negative X direction. Alternatively, the push force towards the positive Y direction can be generated by other structures, and the invention is not limited thereto.

After the lifting portion 131 moves along the negative X direction, the locking portion 132 and the protrusion 125 which were originally engaged with each other will now be separated from each other to release the locking state. Referring to FIG. 3C, a cross-sectional diagram illustrating a protrusion 125 of the cover 120 moving towards a positive Y direction is shown. Meanwhile, the protrusion 125 moves in the positive Y direction along with the cover 120. After the force of the lifting portion 131 is released, the locker 130, being released from the locking state, can move towards the positive X direction to return to its normal position through the elastic member 140. The lower bevel 125a of the protrusion 125 is supported and leans on the upper bevel 132a of the locking portion 132, such that the cover 120 maintains in the open state and towards the positive Y direction. After the cover 120 and the locker 130 are released from the locking state, the movement of the cover 120 is no more restricted, and the cover 120 can be freely opened. The cover 120 can further be opened towards the positive Y direction by using the hooks 123 as pivotal points. Meanwhile, the elastic member 140 enables the locker 130 being in a releases state to return to its normal position to restrict the battery. Therefore, under the circumstance that the cover 120 is opened, the locker 130 still can fix the battery. If the user wants to replace the battery, the user can move the locker 130 again such that the plate 134 is removed out of the receiving slot 113 and no more restricts the battery in the receiving slot 113 and the battery can be removed accordingly.

Figure 4A:
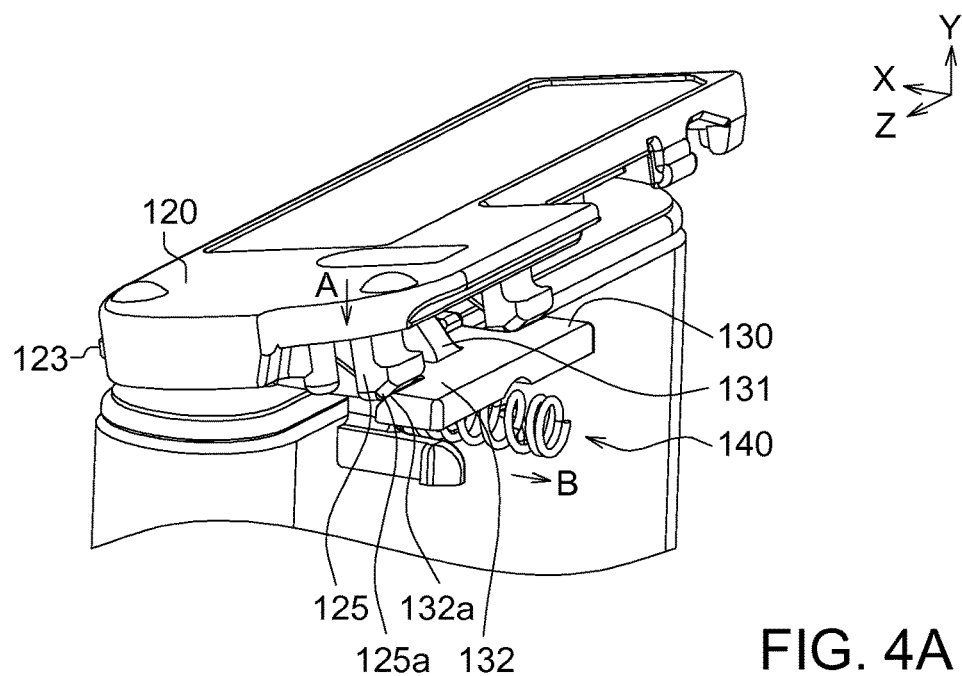
FIGS. 4A and 4B are cross-sectional diagrams illustrating a protrusion of a cover moving downwards.
Figure 4B:
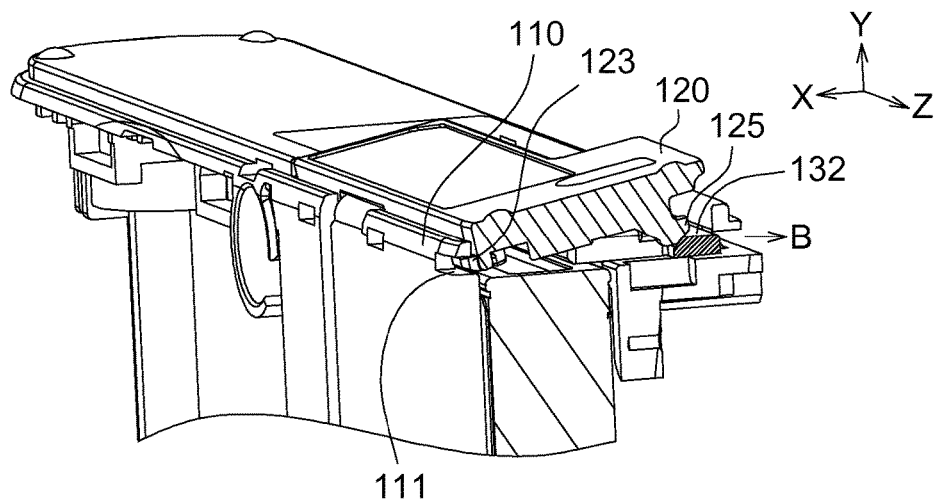

FIGS. 4A and 4B are cross-sectional diagrams illustrating a protrusion 125 of a cover 120 moving towards a negative Y direction. The locking portion 132 and the protrusion 125 respectively have a bevel 132a and a bevel 125a, that is, the upper bevel 132a and the lower bevel 125a opposite to each other. During the assembly process, the user firstly uses the hooks 123 of the cover 120 as pivotal points through which the cover 120 is pivotally connected to the housing 110, and then applies a force on the cover 120 in the negative Y direction. When the cover 120 receives a force and closes downwards, the upper bevel 132a of the locking portion 132 contacts the lower bevel 125a of the protrusion 125, and slides to each other. The protrusion 125 moves towards the negative Y direction (as indicated by the arrow A) to provide a inclined component of force and counteract the pre-stress applied on the locker 130 by the elastic member 140 in the positive X direction. Consequentially, the locking portion 132 receives the force and generates a displacement in the negative X direction (as indicated by arrow B).

Figure 4C:
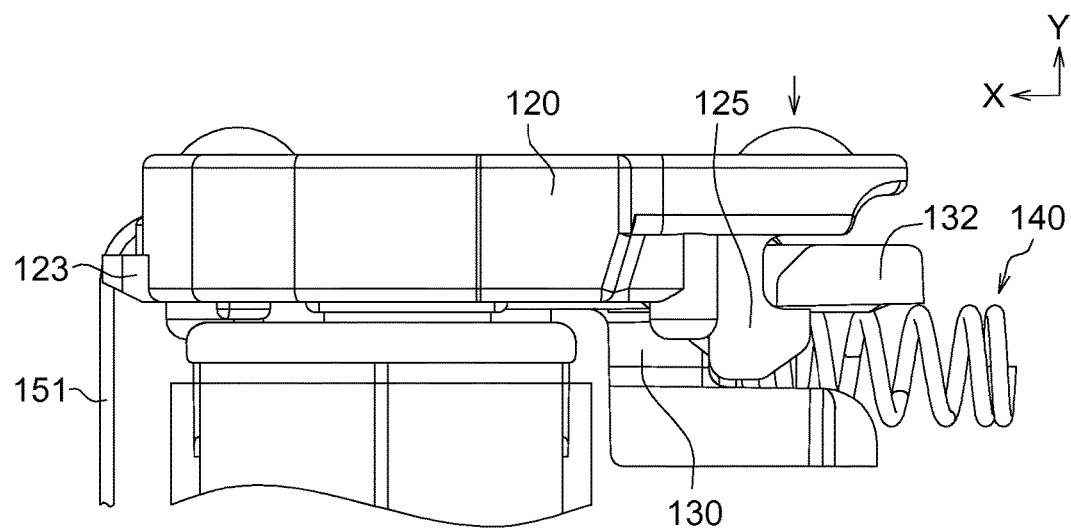
FIG. 4C is a cross-sectional diagram illustrating a cover being completely closed.

FIG. 4C a cross-sectional diagram illustrating a cover 120 being completely closed. The protrusion 125 moves along the bevel of the locking portion 132 towards the negative Y direction until reaching the locking position. Given that the inclined component of force generated by the protrusion 125 is released, the elastic member 140 enables the locker 130 to return to its normal position towards the positive X direction, and the locking portion 132 and the protrusion 125 again return to the locking state to close the cover 120. Meanwhile, the plate 134 of the locker 130 moves backwards and atop the receiving slot 113 to restrict the battery in the receiving slot 113, and the lifting portion 131 extends into the opening 124. Meanwhile, the cover 120 whose two ends are engaged with the hooks 123 and the protrusion 125 cannot be opened. The structure that the two ends of the cover 120 being engaged is disclosed above for exemplification purpose, and the invention is not limited thereto.

According to the above description, the storage structure 100 for an electronic component uses the locker 130 as a common component, not only a component for fixing the battery but also a component for fixing the cover, making the use more convenient. To avoid the cover 120 being easily opened by the user, the lifting portion 131 of the locker 130 is disposed at the opening 124. The user cannot easily touch the lifting portion 131 with his/her finger or apply a force thereto. Instead, the user cannot easily open the cover 120 without using a tool. FIGS. 5A and 5B are schematic diagrams illustrating a cover 120 being opened with a tool. Firstly, the user inserts the tip of the tool 10 to the opening 124 to provide a force to the lifting portion 131 in the negative X direction. Then, the lifting portion 131 pushes the cover 120 to open towards the positive Y direction. Meanwhile, a slit S is exposed between the cover 120 and the housing 110, such that the user can open the cover 120 with his/her hand or the tool via the slit S. The above design avoids the cover 120 being opened easily, and avoids electronic component being damaged or burn down when the user tries to replace the battery in the absence of professional assistance.

The above design of opening the cover 120 by inserting the tip of the tool to the opening 124 is for exemplification purpose only. In another embodiment, the cover 120 can be lifted and opened by way of sliding. Alternatively, the cover 120 can be formed by a hidden open structure without using the opening 124, and the invention is not limited thereto.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A storage structure, comprising:
   a housing having a receiving slot;
   a locker disposed in the receiving slot and comprising a locking portion, the locker being slidable relative to the receiving slot in a first direction;
   a cover comprising a protrusion, the cover and the locker being disengageable from each other in a second direction with a disengagement of the protrusion from the locking portion, the second direction being different from the first direction; and
   a connector connected to the cover and the housing;
   wherein the locker further comprises a lifting portion, the cover further comprises an opening, and when the protrusion and the locking portion are engaged with each other, the lifting portion is disposed in the opening; and
   wherein the lifting portion comprises a bevel, and when the lifting portion moves in the opening, the protrusion is detached from the locker, and the lifting portion pushes the cover by the bevel to open the cover.

2. The storage structure according to claim 1, wherein the protrusion comprises a further bevel, and during the process of engaging the cover and the housing, the locking portion and the protrusion relatively move by the two bevels.

3. The storage structure according to claim 1, wherein the cover comprises at least one hook or at least one slot, and the cover is pivotally connected to the housing by the hook or the slot.

4. A device comprising the storage structure according to claim 1.

5. A storage structure, comprising:
   a housing having a receiving slot;
   a cover covering the receiving slot, and comprising a protrusion;
   a locker disposed in the receiving slot and having a locking portion and a lifting portion, and the locker being slidable relative to the receiving slot in a first direction; the cover and the locker being disengageable from each other in a second direction with a disengagement of the protrusion from the locking portion, the second direction being different from the first direction; and an elastic member connecting the housing and the locker;

wherein the cover further comprises an opening, and when the locking portion and the protrusion are engaged with each other, the lifting portion is disposed in the opening; and wherein the lifting portion comprises a bevel, and when the lifting portion moves in the opening, the protrusion is detached from the locker, and the lifting portion pushes the cover by the bevel to open the cover.

6. The storage structure according to claim 5, wherein the protrusion comprises a further bevel, and during the process of engaging the cover and the housing, the locking portion and the protrusion relatively move by the two bevels.

7. The storage structure according to claim 5, wherein the cover comprises at least one hook or at least one slot, and the cover is pivotally connected to the housing by the hook or the slot.

8. A device comprising the storage structure according to claim 5.

9. A device having a storage structure, and the storage structure comprises:

a housing having a receiving slot;

a locker disposed in the receiving slot and comprising a locking portion, the locker being slidable relative to the receiving slot in a first direction;

a cover comprising a protrusion; and a connector connected to the cover and the housing;

wherein the cover has a locking state in which the locking portion and the protrusion are engaged;

wherein when the cover is released from the locking state, the cover and the locker are disengaged from each other in a second direction, the second direction being different from the first direction;

wherein the cover further comprises an opening, and when the locking portion and the protrusion are engaged with each other, the lifting portion is disposed in the opening; and wherein the lifting portion comprises a bevel, the lifting portion moves in the opening, the protrusion is detached from the locker, and the lifting portion pushes the cover by the bevel to open the cover.

10. The device according to claim 9, wherein the protrusion comprises a further bevel, and during the process of engaging the cover and the housing, the locking portion and the protrusion relatively move by the two bevels.

11. The device according to claim 9, wherein the cover comprises at least one hook or at least one slot, and the cover is pivotally connected to the housing by the hook or the slot.

* * * * *